(12) United States Patent
Witzel et al.

(10) Patent No.: US 8,326,298 B2
(45) Date of Patent: Dec. 4, 2012

(54) TECHNIQUE FOR SERVICE DOMAIN SELECTION

(75) Inventors: Andreas Witzel, Herzogenrath (DE); Ralf Keller, Würselen (DE); Rogier Noldus, BM Goirle (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 447 days.

(21) Appl. No.: 12/513,985

(22) PCT Filed: Nov. 8, 2006

(86) PCT No.: PCT/EP2006/010703
§ 371 (c)(1),
(2), (4) Date: Feb. 5, 2010

(87) PCT Pub. No.: WO2008/055525
PCT Pub. Date: May 15, 2008

(65) Prior Publication Data
US 2010/0144351 A1 Jun. 10, 2010

(51) Int. Cl.
*H04W 4/00* (2009.01)
(52) U.S. Cl. ...................................... 455/435.2; 455/436

(58) Field of Classification Search .................. 455/411, 455/416, 435.2, 436; 370/225, 328, 338, 370/352, 356
See application file for complete search history.

(56) References Cited

U.S. PATENT DOCUMENTS
2003/0185366 A1* 10/2003 Duncan ..................... 379/142.17
2008/0090570 A1* 4/2008 Deshpande et al. ........... 455/436

FOREIGN PATENT DOCUMENTS
WO WO 01/39442 A 5/2001
* cited by examiner

*Primary Examiner* — Sam Bhattacharya (57) ABSTRACT

A technique for performing a service domain selection in a communications network having a default service domain and at least one alternative service domain is described. According to this technique, a switching to the alternative service domain involves the invocation of a supplementary service that is provided as a supplement to a basic service. A method implementation of this technique comprises steps of identifying a basic service type associated with a service request; determining if for at least one of an originating side and a terminating side of the service request the identified basic service type is linked with a subscription to the supplementary service of service domain switching; and invocating the supplementary service of service domain switching if a linking can be determined.

21 Claims, 8 Drawing Sheets

TECHNIQUE FOR SERVICE DOMAIN SELECTION

FIELD OF THE INVENTION

The invention generally relates to the field of service domain selection. More specifically, the invention relates to a service domain selection technique in a communications network having a default service domain such as a circuit-switched service domain and an alternative service domain such as a packet-switched service domain.

BACKGROUND OF THE INVENTION

In the second (2G) and third generation (3G) mobile telephone communication systems, distinct switching domains can be identified within the core networks that service user terminals. These domains typically include the circuit-switched (CS) service domain and the packet-switched (PS) service domain. In the CS domain, signals are physically routed to their destination through a unique connection, whereas in the PS domain individual packets are dynamically routed to the appropriate destinations based on a destination address associated with each packet.

2G and 3G user terminals typically access the core network via a CS access network, i.e. via the CS domain. The CS network access requires that depending on the domain where a particular service will be eventually be performed, there might be a need for switching from the CS access domain to a PS or any other service domain. This implies that a service domain selection has to be performed somewhere in the connection from the user terminal to the core network.

Various service domain selection approaches have already been proposed. In one exemplary service domain selection procedure described in U.S. Pat. No. 6,567,667 B1, service domain selection is performed by the user terminal. More specifically, the user terminal is configured to construct messages which specify one of the CS service domain and the PS service domain for a particular service requested by the user terminal. The domain selection performed within the user terminal is based inter alia on service information received from the network.

The approach of having the service domain selected by the user terminal requires the implementation of a specific decision logic within each user terminal. This means that older user terminals that do not support this decision logic will be barred from service domain selection.

It would thus be beneficial to move the service domain selection procedure from the user terminal to the network side. In this regard, U.S. Pat. No. 6,567,667 B1 proposes two different mechanisms. A first network-based selection mechanism allows an access network to override the service domain selection requested by a user terminal. According to a second mechanism, the access network autonomously selects the service domain when a mobile terminal initiates a communication session without specifying a particular domain. The service domain selection performed by the access network is essentially based on a mapping scheme configured by a network operator. In this mapping scheme, each service is mapped to a particular domain. Depending on the service requested by the user terminal, the access network can thus autonomously select the appropriate service domain by consulting the mapping scheme.

While a network-based mapping scheme can easily be configured by the network operator and does not require any modifications on the terminal side, it also has some drawbacks. First, the autonomous nature of the network-based selection procedure prevents users from influencing the service domain selection procedure. Second, the approach of controlling domain selection via a dedicated mapping scheme is a concept that does not fit very well into the existing network environments.

Accordingly, there is a need for a service domain selection technique that seamlessly integrates into the existing networks.

SUMMARY OF THE INVENTION

This need is satisfied according to a first aspect of the invention by a method of performing a service domain selection in a communications network having a default service domain and at least one alternative service domain, wherein a switching to the alternative service domain involves the invocation of a supplementary service that is provided as a supplement to a basic service. The method comprises the steps of identifying a basic service type associated with the service request; determining if for at least one of an originating side and terminating side of the service request the identified basic service type is linked with a subscription to the supplementary service of service domain switching; and invocating the supplementary service of service domain switching if a linking can be determined.

According to the approach proposed herein, the domain switching process is encapsulated as a supplementary service. The supplementary service concept is very well standardized and therefore easily integrates into existing and future network infra-structures operating according to the standards. Moreover, the standards define various user procedures (also called subscriber procedures) for controlling supplementary services. These standardized procedures, such as Activate, Deactivate and Interrogate, can thus readily be applied to the new supplementary service of service domain switching.

The service domain selection and switching approach of the present invention permits the implementation of highly flexible strategies. It can thus dynamically be decided if a particular service request is to be treated in the default service domain or in the alternative service domain. Furthermore, the invention permits a dynamical selection of gateway or processing components responsible for treating the service request in any one of the default service domain or the alternative service domain.

In one implementation, the method may comprise forwarding the service request to the default service domain if no linking of the identified basic service type with a subscription to the supplementary service of service domain switching can be determined. Even if such a linking can be determined, the service request may still be forwarded to the default service domain, for example because the supplementary service of service domain switching has been disabled. The supplementary service of service domain switching may have been disabled autonomously by the network, by a user via an appropriate subscriber procedure, or by a network operator.

In the case that the supplementary service of service domain switching is invoked, a decision logic for service domain switching may be called. The decision logic may be implemented locally at the site where the supplementary service is invoked or at a remote site. In cases in which the decision logic is at least partly implemented at a remote site, or in other suitable cases, the invoked supplementary service of service domain switching may comprise the steps of sending a service domain selection query; receiving service domain selection information in response to the service domain selection query; and treating the service request in accordance with the received service domain selection information.

According to a first variant, the received service domain selection information includes address information relating to the alternative service domain. In this variant, treating the service request in accordance with the received service domain information may include forwarding the service request to the alternative service domain based on the received address information, so that the requested service may be provided in the alternative service domain.

According to a second variant, the received service domain selection information includes an instruction relating to the default service domain. In this variant, treating the service request in accordance with the received service domain information may include forwarding the service request to the default service domain, so that the requested service may be provided in the default service domain.

The service domain selection approach proposed herein can easily by applied to roaming scenarios in which a user terminal is roaming into a visited network from a home network or from another visited network. In such a roaming scenario, the visited network may or may not support the supplementary service of service domain switching. In cases in which the visited network provides support for this new supplementary service, the support may be indicated towards the home network, for example in context with a location update procedure for the roaming terminal. The home network may then, preferably still in context with the location update procedure, provide address information indicative of a recipient of the service domain selection query.

When indicating support for the supplementary service of service domain switching, at least one supported address format for the service domain selection query may be indicated also. The address information indicative of a recipient of the service domain selection query may then be provided in an address format supported by the visited network. Possible address formats include an E.164 number as used for Signalling System #7 (SS7) Global Title Routing, an SS7 Point Code, a domain name (e.g. a Fully Qualified Domain Name, or FQDN) or an Internet Protocol (IP) address and port number.

Together with the address information indicative of a recipient of the service domain selection query, further information may be provided. This further information may include subscription information indicating for which one of a plurality of basic service types there exists a subscription to the supplementary service of service domain switching. This additional information is useful because, as has been mentioned above, the supplementary service will be tied to a particular basic service type. This tying implies that although a particular user terminal may be eligible for a plurality of basic service types, there need not be a supplementary service subscription for each basic service type.

The service request for which the service domain selection procedure is performed may relate to any kind of service. The requested service may for example be a telephony, facsimile or short message service. Moreover, the service request may relate to at least one of originating, terminating and mid-call services. In the case the service request relates to a mid-call service, the address information required for forwarding the service request to the alternative service domain may have been received and stored already previously in context with, for example, an earlier service invocation procedure for a call setup service request. In such a scenario, the mid-call service can quickly and efficiently be forwarded to the alternative service domain based on the stored address information. In other words, in such a scenario it will not be required to perform the full service domain selection procedure (once more) for the requested mid-call service.

According to a further aspect of the invention, a method of performing a service domain selection in a communications network having a default service domain and at least one alternative service domain is provided, wherein a switching to the alternative service domain involves an invocation of a supplementary service that is provided as a supplement to a basic service type, and wherein for at least one of an originating side and a terminating side of a service request a basic service type underlying the service request is linked with a subscription to the supplementary service. The method comprises the steps of receiving a service domain selection query in context with the invocation of the supplementary service of service domain switching; determining service domain selection information in response to receipt of the service domain selection query, wherein the service domain selection information relates to the treatment of the service request; and sending the determined service domain selection information for enabling a treatment of the service request.

The service domain selection information may include an instruction relating to the default service domain, indicating for example that the service request is to be treated in the default service domain. Alternatively, the service domain selection information may include address information relating to the alternative service domain, indicating that the service request is to be treated in the alternative service domain.

In cases in which the service request is to be treated in the alternative service domain, and in other cases, the address information may be dynamically generated based on at least one of a content of the service domain selection query, network operator preference settings, and load considerations. The content of the service domain selection query may include at least one of information indicative of the basic service type underlying the service request, an originating terminal address, a terminating terminal address, and an address of a sender of the service domain selection query.

As mentioned above, the service request may originate from a roaming terminal. In such scenario, one or more steps in context with the service domain selection query and the application of the service domain logic may be performed in a home network of the roaming terminal.

The invention can be performed in relation to any types of default service domains and alternative service domains. In one scenario, the default service domain is a CS domain, but it may also be any PS domain. The alternative service domain preferably includes at least one of a general PS domain, an Internet Protocol Multimedia Sub-system (IMS) domain, a Private Branch Exchange (PBA) domain, and a fixed network service domain. However, the alternative service domain may in principle also be any CS domain.

The invention can be practiced in the form of hardware, in the form of software, or in the form of a combined hardware/software approach. As for a software aspect, a computer program product is provided. The computer program product comprises program code portions for performing the steps of the present invention when the computer program product is run on one or more computing devices. The computer program product may be stored on a computer-readable recording medium.

As for a hardware aspect, an apparatus for performing a service domain selection in a communications network having a default service domain and at least one alternative service domain is provided, wherein a switching to the alternative service domain involves the invocation of a supplementary service that is provided as a supplement to a basic service. The apparatus comprises an identifying component adapted to identify a basic service type associated with a service request; a determination component adapted to determine if for at least one of an originating side and a terminating side of the service request the identified basic service type is linked with a subscription to the supplementary service of service domain switching; and an invocation component adapted to invocate the supplementary service of service domain switching if a linking can be determined.

The apparatus may be part of a switching device such as a Mobile Switching Center (MSC) or MSC-Server (MSC-S) for a communications network. The apparatus may also be part of a registering device such as a Home Location Register (HLR) for a communications network.

According to further hardware aspect, an apparatus for performing a service domain selection in a communications network having a default service domain and at least one alternative service domain is provided, wherein a switching to the alternative service domain involves an invocation of a supplementary service that is provided as a supplement to a basic service type, and wherein for at least one of an originating side and a terminating side of a service request a basic service type underlying the service request is linked with a subscription to the supplementary service. The apparatus comprises a reception interface adapted to receive a service domain selection query in context with the invocation of the supplementary service of service domain switching; a processor adapted to determine service domain selection information in response to receipt of the service domain selection query, wherein the service domain selection information relates to the treatment of the service request; and a transmission interface adapted to send the determined service selection information for enabling a treatment of the service request.

This apparatus may be included in a communications network that is configured as a home network for a mobile terminal capable of roaming into one or more visited networks. In such a case, the apparatus may be configured to perform service domain selection for the mobile terminal when the mobile terminal is roaming in a visited network.

BRIEF DESCRIPTION OF THE DRAWINGS

In the following, the invention will be described with reference to exemplary embodiments illustrated in the drawings, wherein.

DESCRIPTION OF PREFERRED EMBODIMENTS

In the following description, for purposes of explanation and not limitation, specific details are set forth, such as particular sequences of steps, interfaces and configurations, in order to provide a thorough understanding of the present invention. It will be apparent to one skilled in the art that the present invention may be practiced in other embodiments that depart from these specific details.

Moreover, those skilled in the art will appreciate that the functions explained herein below may be implemented using software functioning in conjunction with a programmed microprocessor or general purpose computers. It will also be appreciated that while the current invention is primarily described in the form of methods and apparatuses, the invention may also be embodied in a computer program product as well as in a system comprising a computer processor and a memory coupled to the processor, wherein the memory is encoded with one or more programs that may perform the functions disclosed herein.

In the following embodiments, various exemplary service domain selection procedures in which domain switching involves the invocation of a supplementary service that is provided as a supplement to a basic service will be described. The supplementary service concept as such is well known in the field of 2G and 3G communications networks. In this regard, reference is made to the 2G Technical Specification (TS) 02.04 for the Global System for Mobile Communications (GSM), titled "Digital cellular telecommunications system (phase 2+); General on supplementary services"; Version 5.2.0 of May 1996 (GSM 02.04). This 2G specification, which is also referenced in various 3G specifications, is herewith incorporated by reference.

As indicated above, the supplementary service concept is very well standardised. It can generally be said that a supplementary service is never provided on a stand-alone basis but always enhances or modifies a basic service. In other words, a supplementary service is never provided on its own but will be offered together with or in association with a basic service. Basic services are generally divided into so-called teleservices and so-called bearer services (as illustrated in Table 3.2 of the GSM 02.04 specification mentioned above). While bearer services typically define the bearer only and are mainly used for data communication, teleservices also define the end system and can be used for speech services (e.g., basic service type TS 11 "Telephony"), facsimile services (e.g., basic service type TS 62 "Automatic Facsimile Group 3"), or short message services (e.g., basic service type TS 21 "Short Message MT/PG").

For 2G and 3G systems, many individual supplementary services, which are each tied to a specific basic service type, have already been defined in numerous specifications. The existing supplementary services include well-known call services such as Calling Line Identification Presentation (CLIP) and Call Hold (HOLD). For the various types of supplementary services, a common set of control procedures such as service activation, service deactivation, service invocation, etc. is available. Due to the fact that both the supplementary services themselves as well as the applicable control procedures are well defined, individual network components, and in particular the MSCs, exactly know how to handle them.

The exact definition of each supplementary service allows to have the execution of a supplementary service in the MSC also for user terminals roaming outside the home network. Moreover, network operators have extended control possibilities for user terminals roaming in non-home networks. In particular, when at a location update the HLR detects that certain supplementary services are not supported in the visited network, the roaming can be restricted, or the subscriber data can be adapted accordingly in the HLR before sending them to the visited network (i.e., to the visitor location register, VLR).

Figure 1:
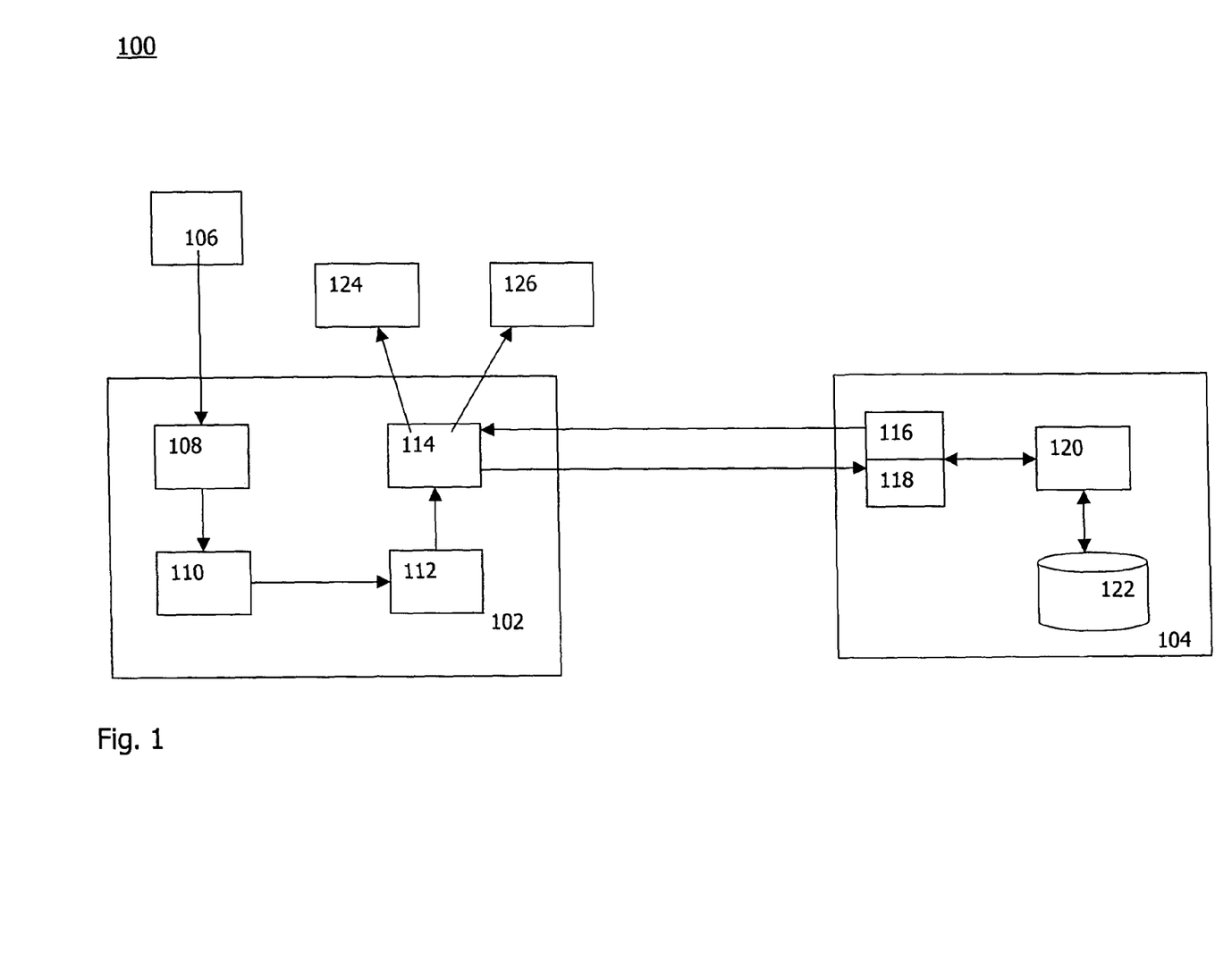
FIG. 1 is a schematic block diagram illustrating a communications network including two apparatus embodiments of the present invention.

The general aspects of supplementary services summarised above also apply to the supplementary service of service domain switching described herein. In this regard, FIG. 1 shows a communications network 100 including two apparatuses 102, 104 that are involved in a service domain selection procedure for a service request initiated by a user terminal 106. The communications network 100 may be a mobile network or a fixed network. Likewise, the user terminal 106 may be a mobile terminal (such as a mobile telephone or a personal digital assistant, also called PDA) or a fixed terminal (such as a personal computer).

Referring to FIG. 1, the apparatus 102 is in charge of invocating the supplementary service of service domain switching, whereas the apparatus 104 is in charge of providing service domain selection information for the invoked supplementary service. In the following, the supplementary service of service domain switching will also be referred to as Support of External Service Domain (SESD).

The invocation apparatus 102 can be included in a switching node of the communications network 100 (such as a MSC-S) or in a registering node (such as a HLR). As shown in FIG. 1, the invocation apparatus 102 comprises an identifying component 108 adapted to identify a basic service type associated with a service request received from the user terminal 106. The invocation apparatus 102 further comprises a determination component 110, a service invocation component 112 and a SESD component 114. Additionally, the invocation apparatus 102 may comprise one or more communication interfaces as needed (not shown in FIG. 1).

The determination component 110 of the invocation apparatus 102 is in communication with the identifying component 108 and adapted to determine if for at least one of an originating side and a terminating side of the service request the basic service type (as identified by the identifying component 108) is linked with an SESD subscription. The invocation component 112 is in communication with the determination component 110 and adapted to invocate the supplementary service of SESD if a linking can be determined by the determination component 110.

The SESD component 114 will selectively be invoked by the invocation component 112 when a linking has been determined. The SESD component 114 is adapted to query the apparatus 104 for service domain selection (or switching) information and to route the service request initiated by the user terminal 106 in accordance with the service domain selection information received from the apparatus 104. In this regard, a decision logic implemented in the SESD component 114 may decide to forward the service request, depending on the service domain selection information, either to a default (e.g., "internal") service domain 124 or to an alternative (e.g., "external") service domain 126.

It should be noted that the service request might alternatively be directly forwarded to the default service domain 124 by the determination component 110 or by the invocation component 112. Such a direct forwarding to either one of these two components 110, 112 could be initiated if the basic service type underlying the service request is not linked with an SESD subscription or, in the case such a linking can be determined, if the supplementary service of SESD has been disabled.

The default service domain 124 can be a conventional CS service domain having a standard CS service engine for treating the service request initiated by the user terminal 106. The alternative service domain 126 may be a PS service domain and compromise a PS service engine for treating the service request. The PS service engine included in the alternative service domain 126 may be one of an IMS service engine, a fixed network service engine, and a PBX based mobile extension.

As shown in FIG. 1, the apparatus 104 providing service domain selection information to the invocation apparatus 102 includes a reception interface 116, a transmission interface 118, a processor 120, and a database 122. The reception interface 116 is adapted to receive a service domain selection query from the SESD component 114 (or from any other component) of the invocation apparatus 102. The service domain selection query will typically be received in context with SESD invocation.

The processor 120 processes the service domain selection query that has been received via the reception interface 118. More specifically, the processor 120 is adapted to determine the required service domain selection information. To this end, the processor 120 may access the database 122 to retrieve the service domain selection information or, in the alternative, raw information from which the processor 120 can generate the requested service domain selection information.

The service domain selection information determined by the processor 120 generally relates to the treatment of the service request initiated by the user terminal 106. The service domain selection information may, for example, be indicative of whether or not the specific basic service type identified by the identifying component 108 is linked with an SESD subscription (and should thus be treated in the alternative service domain). Additionally, or in the alternative, the service domain selection information provided by the apparatus 104 may indicate for which one of the one or more basic service types that might be requested by the user terminal 106 there exists an SESD subscription. According to an additional or alternative variant, the service domain selection information provided by the apparatus 104 may indicate address information of e.g. a specific gateway or service engine in either one of the default service domain 124 and the alternative service domain 126.

It should be noted here that even if the invocation component 112 invocates the supplementary service of SESD (i.e., even if the determination component 110 determines that the identified basic service type is linked with an SESD subscription), the SESD component 114 may still decide to route the service request to the default service domain 124. Such a decision can, for example, be triggered by the service domain selection information received from the apparatus 104.

Figure 2:
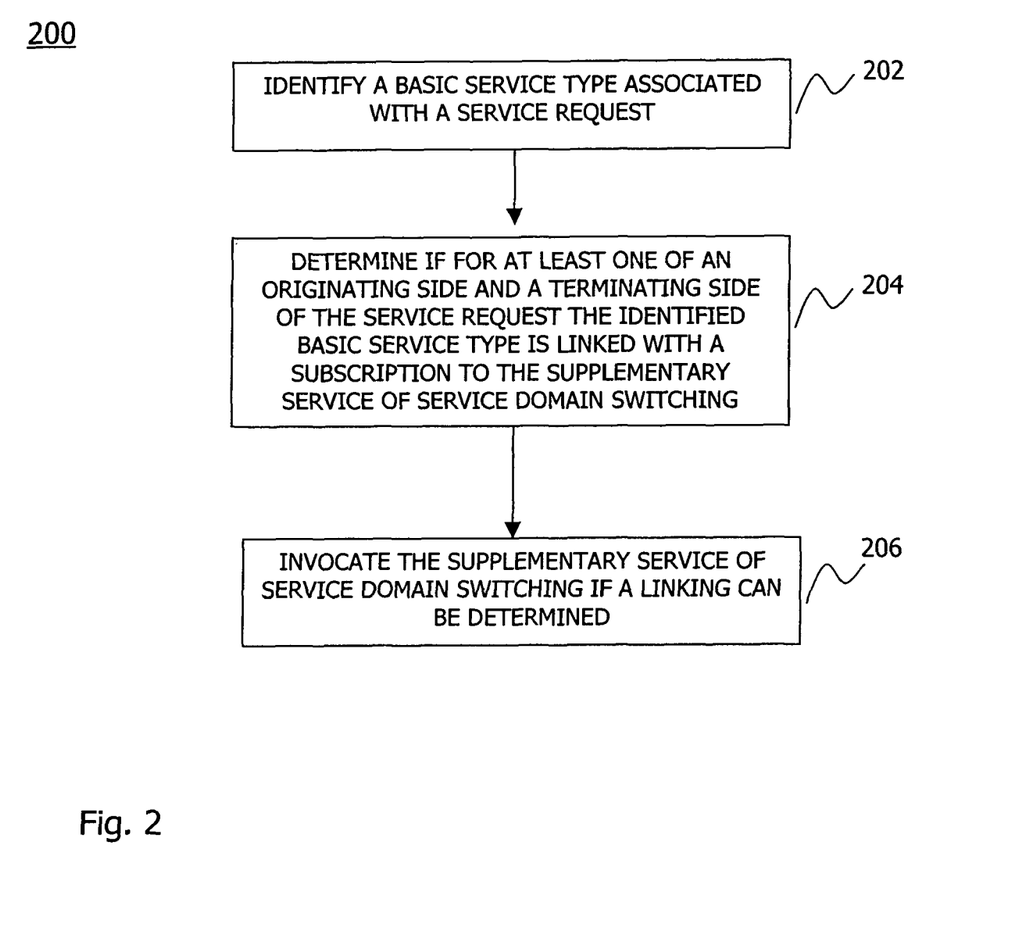
FIG. 2 is a flow chart illustrating a first method embodiment of the present invention.

FIG. 2 shows a flowchart 200 of a first method embodiment of the present invention. The method embodiment may be practised by the invocation apparatus 102 shown in FIG. 1 or by any other apparatus.

The methods starts, in step 202, with identifying a basic service type associated with a service request. In a next step 204, it is determined if for at least one of an originating side and a terminating side of the service request the identified basic service type is linked with an SESD subscription (i.e., with a subscription to the supplementary service of service domain switching). Then, in step 206, the SESD supplementary service is invocated if a linking could be determined in step 204.

During the SESD procedure (not shown in FIG. 2) invoked in step 206, the service request may by default be routed to the alternative service domain. Alternatively, the SESD procedure may include a decision (e.g., on a request-by-request basis) whether to forward the specific service request that has triggered step 202 to the default service domain or to the alternative service domain. The service request is in any case routed to the default service domain if during the determination step 204 no SESD subscription could be determined for the basic service type underlying the service request.

Figure 3:
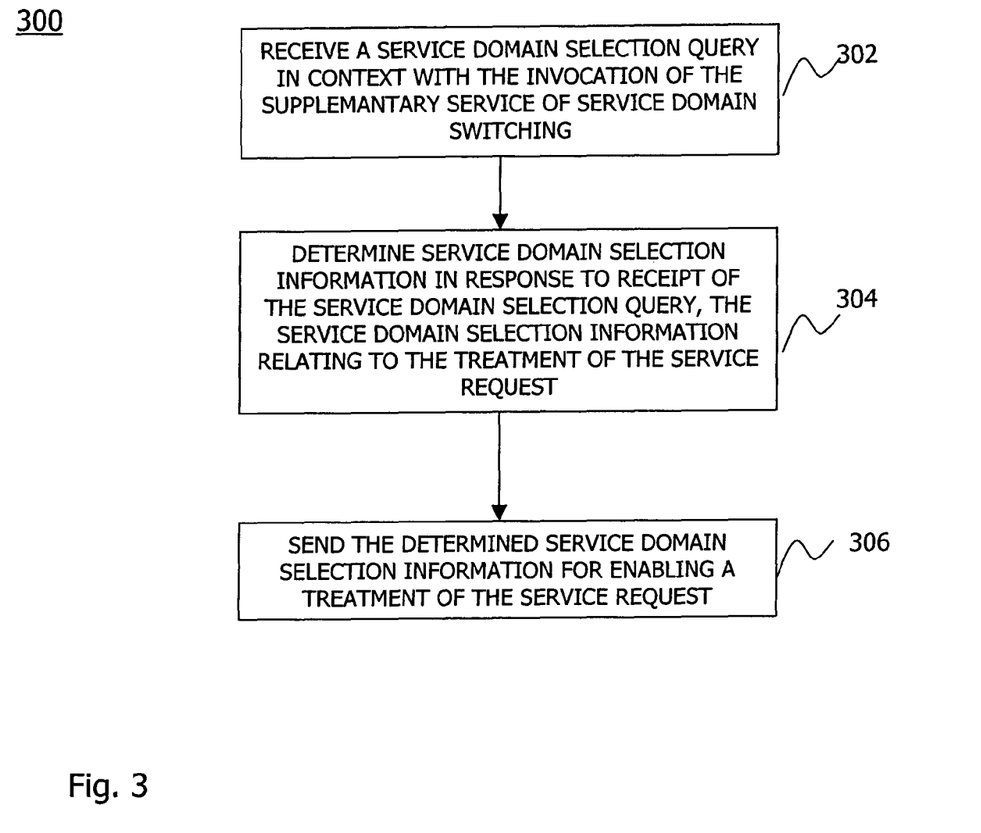
FIG. 3 is a flow chart illustrating a second method embodiment of the present invention.

FIG. 3 shows a flowchart 300 of a further method embodiment. The method embodiment shown in FIG. 3 may be practised by the apparatus 104 shown in FIG. 1 or by any other apparatus.

As shown in FIG. 3, the method starts in step 302 with the reception of a service domain selection query. The service domain selection query will typically be received in context with the invocation of the SESD supplementary service. The method proceeds with step 304. In step 304, service domain selection information is determined in response to the receipt of the service domain selection query. The service domain selection information relates to the treatment of the service request for which the SESD supplementary service has been invoked. In one example, the service domain selection information may be indicative of an address (in either one of the default service domain and the alternative service domain) to which the service request is to be forwarded. In another example, the service domain selection information simply indicates a particular domain (i.e., either the default service domain or the alternative service domain). Of course, the service domain selection information may also include other information relating to the treatment of the service request, or any additional information.

Once the service selection information has been determined in step 304, the method proceeds with step 306. In step 306, the service domain selection information is transmitted to an apparatus such as the invocation apparatus 102 for enabling a treatment of the service request. As has been mentioned above, the treatment of the service request may include forwarding the service request to either one of the default service domain and the alternative service domain.

In the following, further embodiments of the invention that involve specific network nodes and particular signalling sequences will be described with reference to FIGS. 4 to 8. It should be noted that in each embodiment, one or more of the illustrated network nodes may have the configuration of the devices 102, 104 and 106 described above with reference to FIG. 1, or a different configuration.

Figure 4:
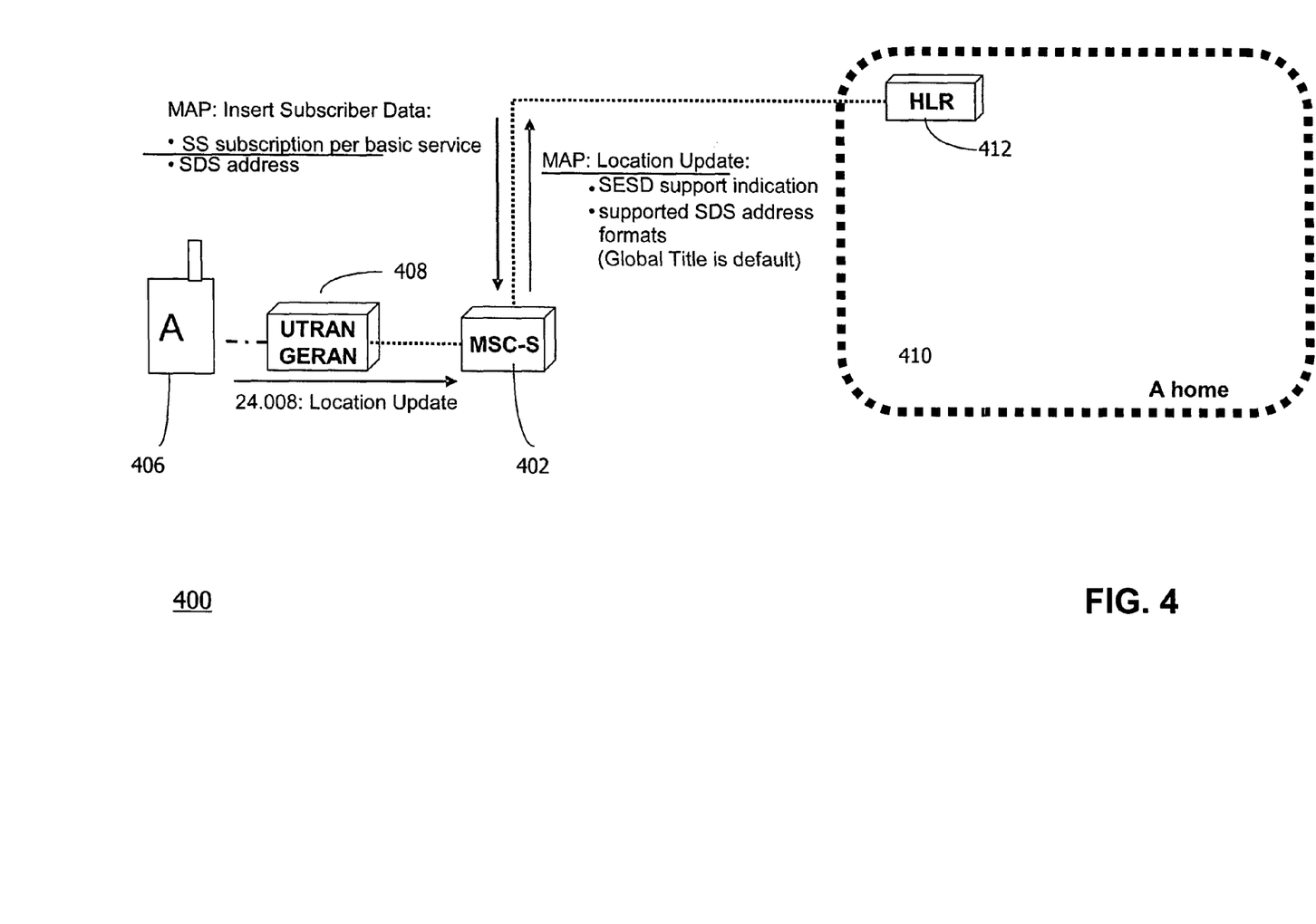
FIG. 4 is a schematic diagram illustrating signalling and components according to another embodiment of the present invention.

FIG. 4 shows an embodiment that illustrates the SESD handling at a CS location update in a Wideband Code Division Multiple Access (WCDMA) and/or GSM network 400. The network 400 includes a mobile user terminal 406 that may or may not have a similar functionality as the user terminal 106 discussed above in context with FIG. 1. The network 400 further includes a Radio Access Network (RAN) 408. The RAN may be configured as a GSM EDGE RAN (GERAN) and/or as a Terrestrial RAN for a Universal Mobile Telecommunications System (UTRAN). As shown in FIG. 4, the network 400 further includes an MSC-S 402 that may or may not have a configuration as shown for the invocation apparatus 102 in FIG. 1, and a HLR 412 that may or may not have a configuration as shown for the apparatus 104 in FIG. 1.

The network situation depicted in FIG. 4 corresponds to a roaming scenario in which the user terminal 406 is roaming into a new MSC-S area of a visited network, while the HLR 412 is located in a home network 410 of the user terminal 406. As is well known in the art, a Location Update procedure as specified in TS 24.008 titled "$3^{rd}$ Generation Partnership Project; Technical Specification Group Core Network; Mobile Radio Interface Layer Specification; Core Network Protocols; Stage 3" will be performed each time the user terminal 406 roams into a new MSC-S area. If the user terminal 406 (i.e., the subscriber associated with the user terminal 406) is unknown in the VLR of the visited network, the MSC-S 402 sends a Location Update Request message in accordance with the Mobile Application Part (MAP) protocol to the HLR 412 associated with the user terminal 406.

In the following, two different cases of the location update procedure will be considered in more detail. According to the first case illustrated in FIG. 4, the MSC-S 402 supports the SESD supplemental service. According to the second case, it will be assumed that the MSC-S 402 does not provide such a support.

As for the first case, the MSC-S 402 indicates its SESD support to the HLR 412 during the Location Update procedure in a MAP Location Update Request message as shown in FIG. 4. In addition to indicating SESD support, the MSC-S 402 further signals to the HLR 412 which of various possible service domain selection (SDS) node address formats the MSC-S 402 supports. The SDS node address will be required later by an invoked SESD supplemental service for appropriately addressing a service domain selection query. The MSC-S 402 may support one or more of the following possible SDS node address formats: E.164 number to be used for SS7 Global Title Routing, SS7 Point Code, domain name (e.g., FQDN), and IP address and port number. One of the SS7 Point Code scheme and the SS7 Global Title Routing scheme could be used as the default addressing scheme as these schemes are conventionally used for MAP signalling to the HLR 412. Optionally, FQDN can be used if a more IP centric addressing scheme is desired.

Upon receipt of the MAP Location Update Request message by the HLR 412, the HLR 412 starts a MAP Insert Subscriber Data procedure. In addition to the conventional (CS-related) subscriber data, the HLR 412 now also inserts SESD-related data into the MAP Insert Subscriber Data message that will be returned to the MSC-S 402. The SESD-related data inserted by the HLR 412 include the signalling address of the SDS node that will later be queried by the MSC-S 402 for obtaining the required service domain selection information. The signalling address of the SDS node is provided in the format indicated by the MSC-S 402 in the MAP Location Updated Request message. If the MSC-S 402 supports several formats, the HLR 412 may return the SDS node address in the supported format that is preferred by the operator of the home network 410. In addition to the SDS node address, the message returned to the MSC-S 402 indicates the individual basic service types that are linked with a SESD subscription for the user terminal 406. For example, the HLR 412 may indicate that there exists an SESD subscription for the basic service type TS 11 (telephoning) only, or that there exists an SESD support for the basic service types TS 11 and TS 62 (facsimile).

After receipt of the MAP Insert Subscriber Data message by the MSC-S 402, the received information is stored in the VLR (not shown). The MSC-S 402 then knows for future service requests initiated by the user terminal 406 whether or not there exists an SESD subscription. In the case of a subscription, the MSC-S 402 can locally determine the address of the SDS node that will provide the required service domain selection information.

As has been mentioned above, the scenario shown in FIG. 4 illustrates the case in which the MSC-S 402 provides SESD support. In the alternative case, in which the MSC-S 402 initiates a conventional MAP Location Update procedure without indicating SESD support, there may occur situations in which the HLR 412 determines that despite the lacking SESD support of the MSC-S 402, there exists an SESD subscription for the user terminal 406. In such a case, the HLR 412 has various possibilities how to respond to the MAP Location Update Request message. According to a first variant, the HLR 412 may simply reject the location update. According to a second variant, the HLR 412 may instruct the MSC-S 402 to map service requests initiated by the user terminal 406 to Customized Application for Mobile Networks Enhanced Logic (CAMEL) Phase 1-related actions (then without mid-call support as CAMEL does not provide any functionalities in this regard). According to a third variant, the MSC-S 402 may simply forward any service requests initiated by the user terminal 406 to the default service domain.

Figure 5:
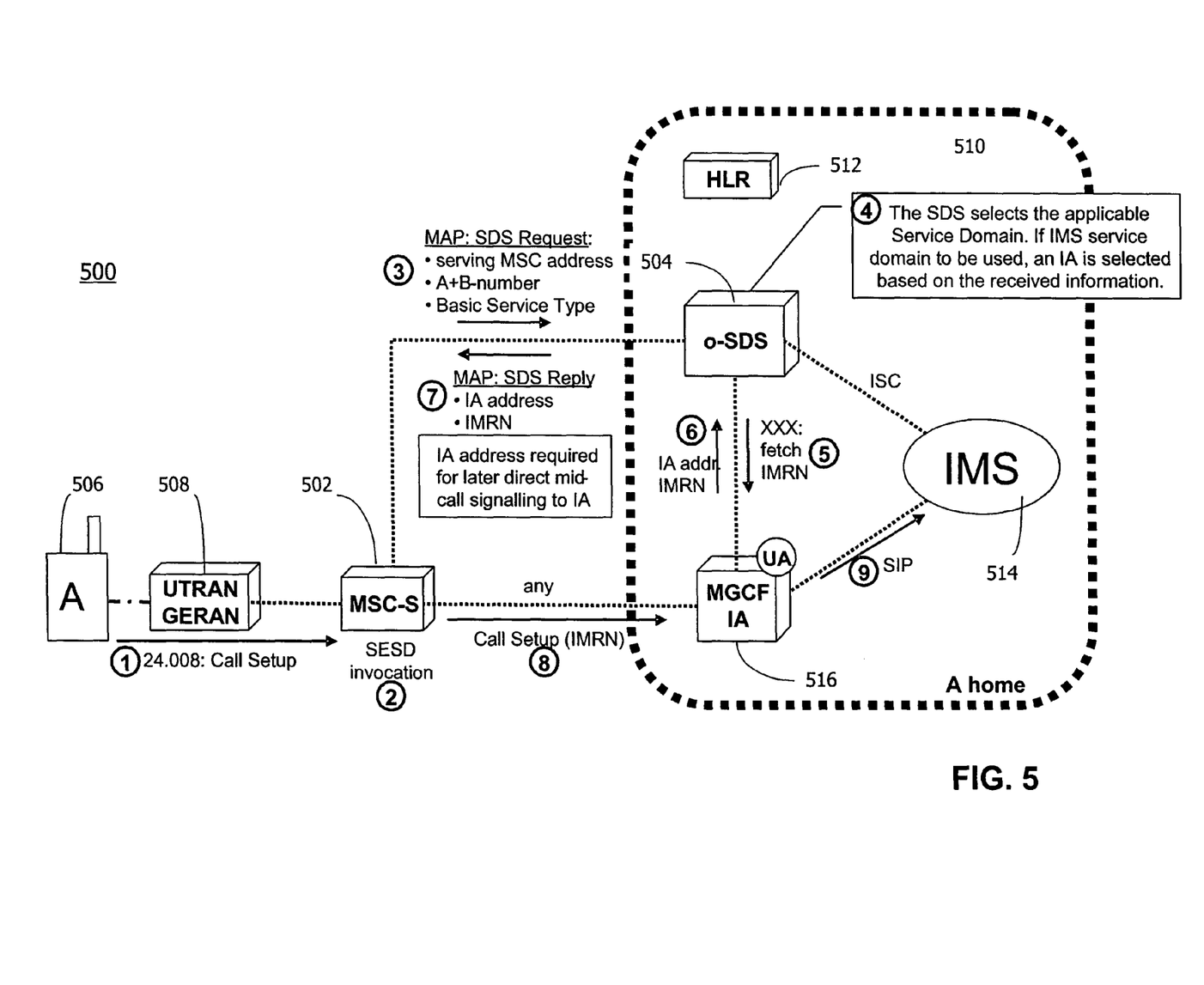
FIG. 5 is a schematic diagram illustrating signalling and components according to a further embodiment of the present invention.

FIG. 5 shows an embodiment of a network scenario relating to the handling of a service request originating from the CS domain (i.e., from a user terminal 506 having a CS network access via an UTRAN/GERAN 508). Similar to the network scenario shown in FIG. 4, the network 500 includes an MSC-S 502 and a HLR 512 in addition to the user terminal 506 and the UTRAN/GERAN 508. Moreover, the network 500, more specifically a home network 510 of the user terminal 506, includes an SDS node 504, a PS service domain with an IMS service engine 514, and a Media Gate-way Control Function (MGCF) Interface Adapter (IA) node 516. The MGCF IA node 516 is associated with a User Agent (UA).

The scenario shown in FIG. 5 could follow the location update procedure discussed above with reference to FIG. 4 or could be performed independently therefrom. Moreover, although the user terminal 506, the network access 508 and the MSC-S 502 are shown in FIG. 5 to lie outside the home network 510, the basic scenario explained below with reference to FIG. 5 is applicable to both roaming and non-roaming cases.

FIG. 5 illustrates the case in which a user terminal 506 associated with an SESD subscription originates a service request which, in the scenario of FIG. 5, takes the form of a call setup request (telephony). Due to the SESD subscription for the requested service, the service request will not be treated in the default CS service domain (not shown), but in the alternative PS service domain (i.e., by the IMS service engine 514).

The procedure starts with a first step in which the user terminal 506 requests a call setup (in accordance with TS 24.008) via the CS network access 508 from the MSC-S 502. The MSC-S 502 thus functions as an originating MSC-S and will have to coordinate originating services.

In a next step, the originating MSC-S 502 identifies that the call setup request received from the user terminal 506 relates to the basic service type of telephony (TS 11). The MSC-S 502 then checks the local VLR data to determine if for the user terminal 506 the identified basic service type TS 11 is linked with an SESD subscription. The corresponding subscription data may have been received earlier, for example during a Location Update procedure as discussed above with reference to FIG. 4. Since the MSC-S 502 can successfully determine a linking between the identified basic service type and an SESD subscription for the user terminal 506, it invocates the SESD supplementary service (step 2 in FIG. 5).

The invoked supplementary service comprises a plurality of sub-steps. In order to forward the call setup request to the PS service domain, the MSC-S 502 first has to determine the interface or gateway in the PS service domain to which the call setup request is to be forwarded. To this end, the MSC-S 502 has to contact the originating SDS node 504. In this context, the MSC-S 502 first determines the address of the SDS node 504 by checking the subscriber data associated with the user terminal 506 in the VLR (not shown). The SDS node address may have been provided to the VLR during a Location Update procedure as shown in FIG. 4, or in any other way.

Before contacting the SDS node 504, the MSC-S 502 has to determine a messaging protocol that is to be used for querying the SDS node 504. In the present embodiment, the MSC-S 502 determines the messaging protocol based on the format of the SDS node address as found in the VRL. If, for example, the SDS address format is E.164, the MSC-S 502 will use the MAP protocol with Global Title Routing. If, on the other hand, the address format is SS7 Point Code (SPC), the MSC-S 502 will use the MAP protocol with SPC routing. As for the SDS node address format of FQDN, there currently does not exist a standardised messaging protocol associated therewith. In such a case, the MSC-S 502 may have to rely on a protocol such as the Extensible Mark-up Language (XML), the Session Initiation Protocol (SIP), or the Stream Control Transmission Protocol (SCTP).

Once the address of the SDS node 504 has been found and the messaging protocol associated with the underlying address format has been determined, the MSC-S 502 generates a service domain selection query (called MAP SDS Request message; step 3 in FIG. 5) and sends it to the SDS node 504. The service domain selection query not only aims at querying information about the service domain that is to treat the call setup request, but additionally provides information about the call setup request to the SDS node 504. The information about the call setup request provided together with the service domain selection query includes the telephone number of the originating user terminal 506 ("A-number"), the number of the terminating user terminal ("B-number"), the International Mobile Subscriber Identity (IMSI) number of the user terminal 506 ("A-IMSI"), the type of the requested basis service (e.g., TS11), as well as the address of the MSC-S 502 and location information pertaining to the user terminal 506 (e.g., a location number or a cell identifier).

In response to receipt of the service domain selection query from the MSC-S 502, the SDS node 504 performs a service domain selection procedure (step 4 in FIG. 5). The service domain selection procedure performed by the SDS node 504 is typically based on the information received with the service domain selection query from the MSC-S 502, as well as on network operator preference settings and/or load considerations in particular with respect to the PS service domain. As the SDS node 504 is located in the home network 510 of the user terminal 506, the network operator preference settings considered during the service domain selection decision will be the preferences of the home network operator. Due to the identified SESD subscription, the SDS node 504 will normally select the PS service domain as the domain where the call setup request initiated by the user terminal 506 is to be treated. However, depending on for example load considerations with respect to the PS service domain, the SDS node 504 might also choose the default CS service domain in spite of the fact that there exists an SESD subscription.

If the SDS node 504 determines that the PS service domain is to be used for the service request, the SDS node 504 has also to select an IA node that is to act as gateway or interface to the PS service domain (for user plane and control signalling). The IA node to be used for entering the PS service domain may be dynamically selected based on the information received together with the service domain selection query, network operator preference settings and/or load considerations.

In FIG. 5, steps 5 and 6 illustrate an exemplary procedure how to determine the IA node (i.e., how to determine the routing number to the PS service domain). In this regard, the SDS node 504 first queries the MGCF IA 516 to provide an IMS Routing Number (IMRN). The MGCF IA 516 then returns both an IMRN and the IA signalling address which can be used after the call has been set up for handling mid-call service requests. For future reference, the MGCF IA 516 will also store any information about the user terminal 506 and the associated subscriber received in step 5 from the SDS node 504. To this end, the IMRN is used as a key.

Once the SDS node 504 has received the IMRN and the IA address from the MGCF IA 516, it forwards this service domain selection information to the MSC-S 502 in a MAP SDS Reply message (step 7 in FIG. 5). Upon receipt of the service domain selection information, the MSC-S 502 forwards the call setup request to the IMRN identified in the service domain selection information. The forwarding of the call setup request based on the IMRN routes the call to the MGCF IA 516 (step 8 in FIG. 5).

In the MGCF IA 516, the call setup request received from the MSC-S 502 is translated into the call control signalling protocol used within the PS service domain. In the embodiment shown in FIG. 5, the service request is translated into SIP. Additionally, the MGCF IA 516 retrieves the information about the user terminal 506 and the associated subscriber (as previously received from the SDS node 504 in step 5) using the IMRN received from the MSC-S 502 as a key to find this information. Finally, the MGCF IA 516 forwards the translated call setup request, and optionally at least portions of the retrieved terminal and subscriber information, to the IMS service engine 514 (step 9 in FIG. 5). The IMS service engine 514 is from then on fully responsible for handling the call.

In one implementation of the embodiment shown in FIG. 5, the MSC-S 502 will not query the SDS node 504 for every originating CS call, but would store an initially received IMRN and IA address in the VLR (not shown). This data may be stored together with a time stamp in case the SDS node 504 indicates that the IMRN is a static address. The MSC-S 502 would then query the SDS node 504 in response to a new service request only if the time stamp indicates that the data might be outdated.

The decision scenario discussed above with reference to FIG. 5 is advantageous as it allows for the implementation of a highly granular decision logic. This means, for example, that if the subscriber wishes to use the IMS service engine 514 for telephony services (TS 11) only, then a SESD subscription is only required for the basic service type TS11, and all other basic service types such as facsimile and SMS may still be handled at the MSC-S 502 locally the conventional CS way. Even if there is a SESD subscription, the SDS node 504 can still decide for each individual TS11 call to fall back to the default CS service domain instead of breaking into the PS service domain. Additionally, the SDS node 504 can dynamically perform resource selection within the PS service domain, and in particular IA selection, based on one or more parameters, including the basic service type, the originating/terminating telephone terminal number, the location of the originating/terminating user terminal, and load considerations.

Figure 6:
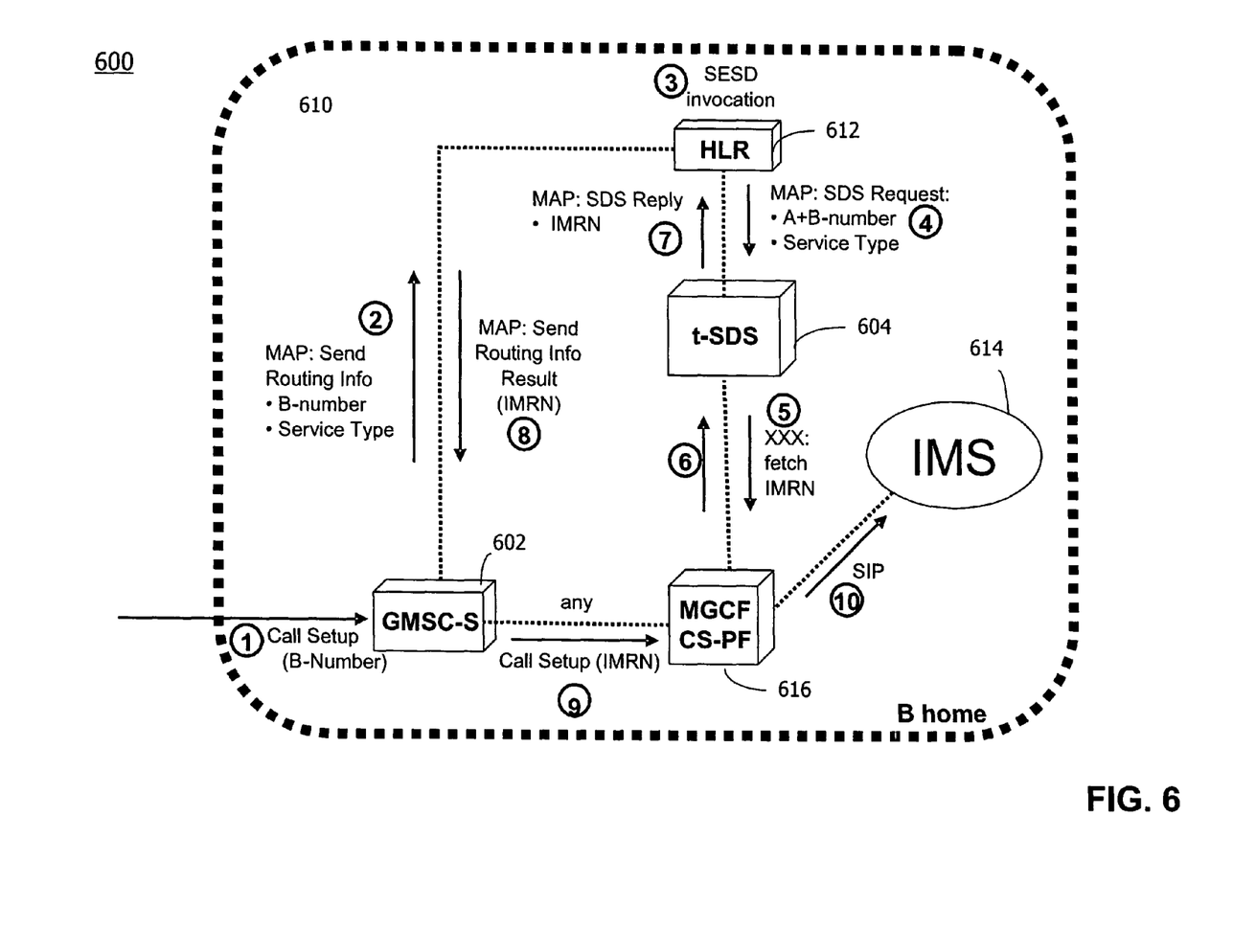
FIG. 6 is a schematic diagram illustrating signalling and components according to a still further embodiment of the present invention.

While FIG. 5 shows a scenario in which there exists an SESD subscription for originating services, FIG. 6 illustrates the case in which an alternative service domain is required for treating terminating services. More specifically, FIG. 6 shows a network environment 600 in which a call terminates at a user terminal (not shown) that is associated with an SESD subscription.

The network 600 includes a home network 610 of the terminating user terminal, a Gateway MSC-S (GMSC-S) 602, a terminating SDS (t-SDS) node 604, a HLR 612, an IMS service engine 614, and a MGCF CS-PF 616.

The signalling sequence illustrated in FIG. 6 starts with a first step in which the GMSC-S 602 receives a service request relating to a call setup destined for a terminating user terminal B (not shown). The call setup request indicates the telephone number of the terminating user terminal ("B-number").

In a next step (step 2 in FIG. 6), the GMSC-S 602 will query the HLR 612 for routing information. To this end, the GMSC-S 602 sends a MAP Send Routing Info message to the HLR 612. This message includes the telephone number ("B-number") of the terminating user terminal as well as an indication of the basic service type underlying the call setup request.

Upon receipt of the MAP Send Routing Info message, the HLR 612 locally checks the subscriber data associated with the terminating user terminal. If the HLR 612 determines that for the particular terminating user terminal the indicated basic service type is associated with an SESD subscription, the HLR 612 invocates the SESD supplementary service (step 3 in FIG. 6).

Invocation of the SESD supplementary service by the HLR 612 results in a similar signalling as already described above with reference to FIG. 5 and the MSC-S 502. That is, the HLR 612 generates a service domain selection query in the form of a MAP SDS Request message and sends it to the SDS node 604 (step 4 in FIG. 6). This message includes the telephone numbers of both the originating user terminal A as well as the terminating user terminal B. Additionally, the basic service type underlying the call setup request is indicated. Optionally, the service domain selection query generated by the HLR 612 may also include the address of the GMSC-C 602.

Upon receipt of the service domain selection query at the SDS node 604, the SDS node 604 performs a service domain selection procedure to arrive at a service domain selection decision. The decision will be based on the information received together with service domain selection query from the HLR 612, and optionally on network operator preference settings and/or load considerations with respect to the PS domain where the IMS service engine 614 is located. It should be noted that since the SDS node 604 is located in the home network 610 of the terminating user terminal, the preference settings of the home network operator of the terminating user terminal will be considered.

The service domain selection decision of the SDS node 604 will be performed in a similar manner as described above for the originating SDS node 504 of FIG. 5. This means that if the SDS node 604 decides that the PS service domain is to be used for treating the terminating call, the SDS node 604 also has to select the specific interfacing node which will act as a gateway or interface to the PS service domain in relation to user plane and control signalling.

In the scenario shown in FIG. 6, the interfacing node 616 that may be selected by the SDS node 604 is called MGCF CS-PF. CS-PF stands for Circuit-Switched Presentation Function as defined, for example, in the Voice Call Continuity (VCC) standardization context. The MGCF CS-PF 616 does not represent a terminal interface, but a network interface. More specifically, the MGCF CS-PF 616 can act a proxy for the user terminal (not shown in FIG. 6) towards the PS domain with the IMS service engine 614.

The SDS node 604 communicates with the MGCF CS-PF 616 in a similar manner as described above with reference to FIG. 5 for the SDS nodes 504 and the MGCF-IA 516 (steps 5 and 6 in FIG. 6) to receive, inter alia, an IMRN. The SDS node 604 forwards the IMRN received from the MGCF CS-PF 616 via a MAP SDS Reply message to the HLR 612 (step 7 in FIG. 6), which forwards the IMRN in a MAP Send Routing Info Result message to the GMSC-S 602 (step 8 in FIG. 6). As soon as the GMSC-S 602 receives the IMRN, it forwards the call setup request to the IMRN. This results in a routing of the call to the MGCF CS-PF 616 (step 9 in FIG. 6).

At the MGCF CS-PF 616, the call setup request received from the GMSC-S 602 is translated into the call control signalling protocol used in the PS service domain. In the embodiment shown in FIG. 6, the call setup request is thus translated into SIP. If required, the MGCF CS-PF 616 may additionally retrieve information relating to the terminating user terminal and to its subscriber using the IMRN as a key. The retrieved information may have been received already earlier from the HLR 612/SDS node 604. The translated call setup request, possibly together with the retrieved terminal and subscriber information, is then sent to the IMS engine 614 (step 10 in FIG. 6). From then on, the IMS engine 614 is fully responsible for call handling.

In an alternative scenario not shown in FIG. 6, the HLR 612 could instruct the GMSC-S 602 to query the SDS node 604 directly. The SDS node 604 would then return the IMRN directly to the GMSC-S 602.

Figure 7:
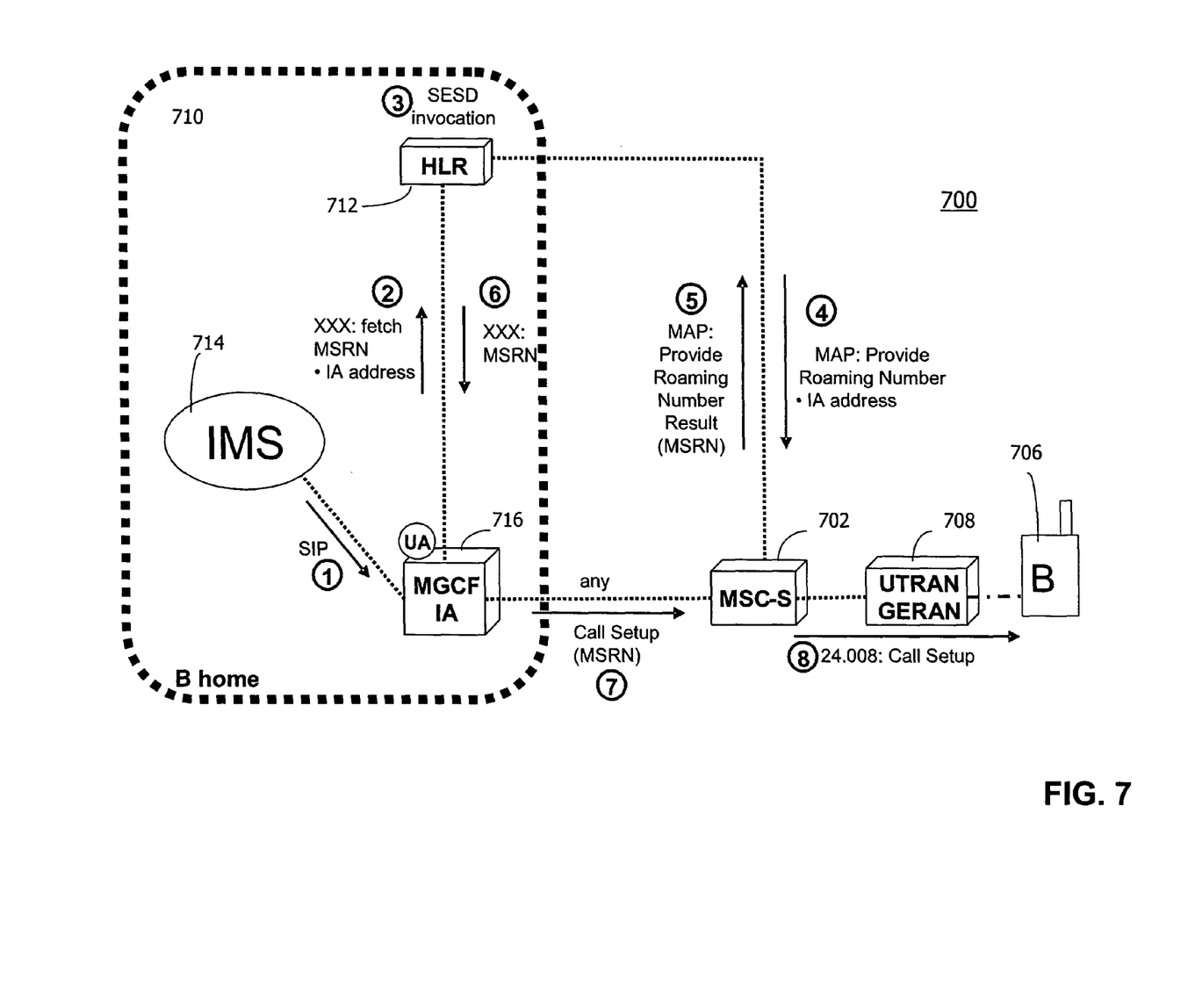
FIG. 7 is a schematic diagram illustrating signalling and components according to another embodiment of the present invention.

FIG. 7 shows an embodiment of a network scenario 700 relating to the handling of a CS terminating call setup request that has been treated in the PS service domain. As shown in FIG. 7, the network 700 comprises a terminating user terminal 706 having a CS network access via a radio access network 708 to a MSC-S 702. A home network 710 of the user terminal 706 includes a HLR 712, an IMS service engine 714, and a MGCF IA 716. The signalling steps shown in FIG. 7 can follow the signalling steps discussed above with reference to FIG. 6.

The signalling shown in FIG. 7 starts after the IMS service engine 714 located in the PS service domain has applied one or more terminating services to the call setup request destined for user terminal 706. Since user terminal 706 has a CS network access, the call setup request that has been treated in the PS service domain must be terminated in the CS domain.

With reference to FIG. 7, the IMS service engine 714 passes the call setup request that has been treated in the PS service domain as a SIP message to the MGCF IA 716. Upon receipt of the call setup request from the IMS service engine 714, the MGCF IA 716 has to fetch a Mobile Station Roaming Number (MSRN) from the HLR 712. To this end, the MGCF IA 716 sends a Fetch message to the HLR 712 (step 2 in FIG. 7). The Fetch message also includes the IA signalling address of the MGCF IA 716. Once the call has been set up, the IA address may later be used for directly contacting the MGCF IA 716 when mid-call services are requested (see FIG. 8).

The Fetch message that is sent by the MGCF IA 716 invokes (or at least references in some way) the SESD supplementary service in the HLR 712 (step 3 in FIG. 7). In this way, the MGCF IA 716 informs the HLR 712 that this is not a conventional MAP Send Routing Info request, but an SESD-related MSRN request. The SESD invocation or referencing may result in a suppression of conventional checks and actions that are typically performed in context with a conventional MAP Send Routing Info operation but not necessarily required in the context of FIG. 7.

The HLR 712 now has to obtain the MSRN from the MSC-S 702. To this end, the HLR 712 generates a conventional MAP Provide Roaming Number message that is modified to also carry the IA address of the MGCF IA 716 to the MSC-S 702 (step 4 in FIG. 7). The MSC-S 702 locally stores the IA address received from the HLR 712 in the VLR (not shown). The IA address stored by the MSC-S 702 will be used once the call has been set up for handling mid-call service requests.

The MSC-S 702 then sends the requested MSRN to the HLR 712 in a MAP Provide Roaming Number Result message (step 5 in FIG. 7). The HLR 712 forwards the MSRN received from the MSC-S 702 to the MGCF IA 716. The MGCF IA re-translates the call setup request encapsulated in the SIP message into an appropriate format for the MSC-S 702 and routes the re-translated call setup request using the received MSRN to the MSC-S 702 (step 7 in FIG. 7). From the MSC-S 702, the call setup request is routed via the access network 708 to the terminating user terminal 706 in a conventional manner.

Since both the terminating MSC-S 702 of FIG. 7 as well the originating MSC-S 502 of FIG. 5 have been provided with the IA address during call setup, the IA address may be used during the call for the routing of mid-call service requests. The handling of mid-call service requests will now exemplarily be described with reference to the embodiment shown in FIG. 8 for an originating user terminal 806 that is associated with an SESD subscription for the particular basic service type underlying the mid-call service request. The network scenario shown in FIG. 8 includes some of the components that are also shown in FIG. 5, namely an originating user terminal 806 having a CS network access 808, a MSC-S 802, a MGCF IA 816 and an IMS service engine 814. Both the MGCF IA 816 and the IMS service engine 814 are located in a home network 810 of the user terminal 806.

Figure 8:
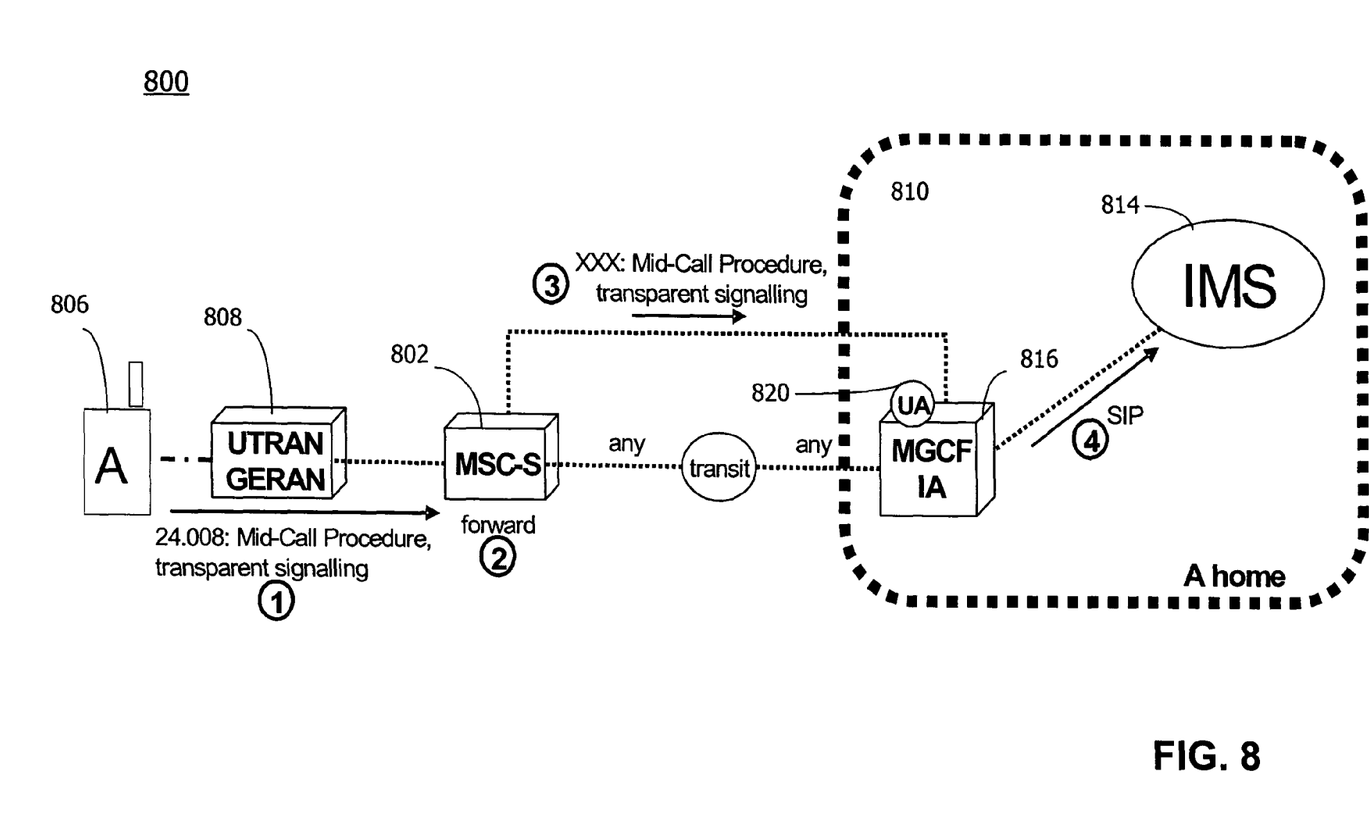
FIG. 8 is a schematic diagram illustrating signalling and components according to one more embodiment of the present invention

Possible mid-call services that may be requested by the user terminal 806 include one of the existing GSM/WCDMA mid-call services (e.g., Hold, Multi Party, etc.) or a new Direct Transfer Application Part (DTAP) operation providing a transparent signalling channel from the user terminal 806 to the MGCF IA 816.

When the mid-call service request that has been sent by user terminal 806 (step in FIG. 8) is received by the MSC-S 802, the MSC-S checks whether or not there exists an SESD subscription for the basic service type underlying the ongoing call. This can be done by consulting the data previously stored in the VLR (not shown).

If the MSC-S 802 determines that the basic service type underlying the ongoing call is actually linked with an SESD subscription, the mid-call service request received from the user terminal 806 is directly forwarded to the PS service domain using the IA address received during call setup as described in context with FIG. 4 (step 2 in FIG. 8). In this context, transparent signalling as indicated by step 3 may be used between the MSC-S 802 and the MGCF IA 816. To this end, a new TS 24.008 mid-call message can be defined which allows the user terminal 806 to transparently send information related to a mid-call service via the MSC-S 802 to the MGCF IA 816.

The MGCF IA 816 then translates the received mid-call service request into the appropriate signalling format used in the PS service domain. In the embodiment shown in FIG. 8, the mid-call service request is encapsulated in a SIP message that is sent to the IMS service engine 814 (step 4 in FIG. 8). From then on, the IMS service engine 814 is fully responsible for handling the mid-call service request.

As shown in FIG. 8, the MGCF IA 816 is equipped with an UA 820. As the MGCF IA 816 generally shields CS access details from the PS/IMS domain, the UA 820 is used to map any TS 24.008 mid-call message originated from the user terminal 806 into the proper SIP signalling needed from the requested mid-call service. So the user terminal 806 can be considered as remotely controlling the UA 820 in the MGCF-IA 816.

As has become apparent from the embodiments, service domain switching can be facilitated by encapsulating at least portions of the service domain switching procedure into a supplementary service. The implementation of a supplementary service has the additional advantage that well known subscriber procedures can be used to interrogate, activate, deactivate, etc. this new supplementary service. The new supplementary service may be given a dedicated service code that may be used in any call independent subscriber procedures. Applying the existing subscriber procedures to the new supplementary service gives the subscribers an excellent possibility for controlling the switching between conventional (MSC-based) CS services on the one hand and the services offered by alternative (external) service domains such as the PS service domain on the other hand.

User interfaces (such as a Web Portal) may be provided that facilitate the managing of a subscription to a new supplementary service and its status. When a Web Portal is provided, the user may utilise a PS access for self-administration of the subscription and its status.

A further advantage of the new supplementary service of service domain switching is its capability of providing a smooth migration from the conventional CS infrastructure to the INS or any other service domain. In contrast to conventional value-added services such as CAMEL, the approach proposed herein is capable of providing support also for mid-call services. Additionally, the present approach perfectly fits into the existing network infrastructure and easily provides support for self-administration. The solutions proposed herein facilitate the harmonization of wireline, mobile and voice-over-IP telecommunication using, at least for some users, a single service-provisioning domain. This means that at least users with appropriate subscriptions will always experience the same service, regardless of the access type used.

A still further improvement that arises from the service domain switching solution proposed herein is the fact that the solution can be implemented without major technical changes. Accordingly, even older terminals can benefit from the dynamic service domain switching concept. Additionally, the concept can be implemented in a way that permits at least some user control (e.g. via conventional subscriber procedures or via a Web Portal) without necessarily involving major modifications on the terminal side.

Although embodiments of the present invention have been illustrated in the accompanying drawings and described in the description, it will be understood that the invention is not limited to the embodiments disclosed herein. In particular, the invention is capable of numerous rearrangements, modifications and substitutions without departing from the spirit of the invention as set forth and defined by the following claims.

The invention claimed is:

1. A method of performing a service domain selection in a communications network having a default service domain and at least one alternative service domain, wherein switching to the alternative service domain involves invocation of a supplementary service that is provided as a supplement to a basic service, the method comprising the steps of:
   identifying a basic service type associated with a service request;
   determining if, for at least one of an originating side and a terminating side of the service request, the identified basic service type is linked with a subscription to the supplementary service of service domain switching; and
   invoking the supplementary service of service domain switching if a linking can be determined.

2. The method of claim 1, comprising the step of forwarding the service request to the default service domain if no linking can be determined or if the supplementary service of service domain switching has been disabled.

3. The method of claim 1, wherein the invoked supplementary service of service domain switching comprises the method steps of:
   a). sending a service domain selection query;
   b). receiving service domain selection information in response to the service domain selection query; and
   c). treating the service request in accordance with the received service domain selection information.

4. The method of claim 3, wherein the received service domain selection information includes address information relating to the alternative service domain, and treating the service request in accordance with the received service domain information includes forwarding the service request to the alternative service domain based on the received address information.

5. The method of claim 3, wherein the received service domain selection information includes an instruction relating to the default service domain, and treating the service request in accordance with the received service domain information includes forwarding the service request to the default service domain.

6. The method of claim 3, further comprising the steps of:
   indicating support for the supplementary service of service domain switching in context with a location update procedure for a roaming terminal; and
   receiving address information for the service domain selection query in context with the location update procedure.

7. The method of claim 6, further comprising the steps of:
   indicating at least one supported address format for the service domain selection query; and
   receiving the address information in the supported address format.

8. The method of claim 6, further comprising receiving subscription information indicating for which one of a plurality of basic service types there exists a subscription to the supplementary service of service domain switching.

9. The method of claim 1, wherein the service request relates to a mid-call service.

10. The method of claim 4, wherein the address information has already previously been received and stored in context with a service invocation procedure for a call setup service request, wherein the mid-call service request is forwarded to the alternative service domain based on the stored address information.

11. A method of performing a service domain selection in a communications network having a default service domain and at least one alternative service domain, wherein switching to the alternative service domain involves invocation of a supplementary service that is provided as a supplement to a specific, basic service type, and for at least one of an originating side and a terminating side of a service request, a basic service type underlying the service request is linked with a subscription to the supplementary service, the method comprising the steps of:
   receiving a service domain selection query in context with the invocation of the supplementary service of service domain switching;

determine service domain selection information in response to receipt of the service domain selection query, the service domain selection information relating to the treatment of the service request; and sending the determined service domain selection information for enabling a treatment of the service request.

12. The method of claim 11, wherein the service domain selection information includes address information relating to the alternative service domain.

13. The method of claim 12, further comprising the step of dynamically determining the address information based on at least one of a content of the service domain selection query, network operator preference settings, and load considerations.

14. The method of claim 13, wherein the content of the service domain selection query includes at least one of information indicative of the basic service type underlying the service request, an originating terminal address, a terminating terminal address, and an address of a sender of the service domain selection query.

15. The method of claim 11, wherein the service domain selection information includes an instruction relating to the default service domain.

16. The method of claim 1, wherein the default service domain is a circuit-switched domain, and the alternative service domain includes at least one of a general packet-switched domain, an Internet Protocol Multimedia Subsystem domain, a Private Branch Exchange domain, and a fixed network service domain.

17. An apparatus for performing a service domain selection in a communications network having a default service domain and at least one alternative service domain, wherein a switching to the alternative service domain involves the invocation of a supplementary service that is provided as a supplement to a basic service, the apparatus comprising:

an identifying component adapted to identify a basic service type associated with a service request;

a determination component adapted to determine if for at least one of an originating side and a terminating side of the service request the identified basic service type is linked with a subscription to the supplementary service of service domain switching; and an invocation component adapted to invocate the supplementary service of service domain switching if a linking can be determined.

18. The apparatus of claim 17, being comprised in a switching device (MSC-S) for a communications network.

19. The apparatus of claim 17, being comprised in a registering device (HLR) for a communications network.

20. An apparatus for performing a service domain selection in a communications network having a default service domain and at least one alternative service domain, wherein a switching to the alternative service domain involves an invocation of a supplementary service that is provided as a supplement to a basic service type, and for at least one of an originating side and a terminating side of a service request a basic service type underlying the service request is linked with a subscription to the supplementary service, the apparatus comprising:

a reception interface for receiving a service domain selection query in context with the invocation of the supplementary service of service domain switching;

a processor for determining service domain selection information in response to receipt of the service domain selection query, the service domain selection information relating to the treatment of the service request; and a transmission interface for sending the determined service selection information for enabling a treatment of the service request.

21. The apparatus of claim 20, being included in a communications network that is configured as a home network for a mobile terminal which is capable of roaming into one or more visited networks, wherein the apparatus is configured to perform service domain selection for the mobile terminal when the mobile terminal is roaming in a visited network.

* * * * *

UNITED STATES PATENT AND TRADEMARK OFFICE
CERTIFICATE OF CORRECTION

PATENT NO. : 8,326,298 B2
APPLICATION NO. : 12/513985
DATED : December 4, 2012
INVENTOR(S) : Witzel et al.

It is certified that error appears in the above-identified patent and that said Letters Patent is hereby corrected as shown below:

In Column 17, Line 29, delete "INS" and insert -- IMS --, therefor.

Signed and Sealed this
Nineteenth Day of March, 2013

Teresa Stanek Rea
*Acting Director of the United States Patent and Trademark Office*